United States Patent
Bothwell et al.

(10) Patent No.: US 7,680,421 B2
(45) Date of Patent: Mar. 16, 2010

(54) MULTIMODE OPTICAL FIBRE COMMUNICATION SYSTEM

(75) Inventors: Andrew Bothwell, Ipswich (GB); Simon Meadowcroft, Stowmarket (GB)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 692 days.

(21) Appl. No.: 11/473,834

(22) Filed: Jun. 23, 2006

(65) Prior Publication Data

US 2007/0009266 A1    Jan. 11, 2007

(30) Foreign Application Priority Data

Jul. 7, 2005    (GB) .................................. 0513898.7

(51) Int. Cl.
*H04B 10/04* (2006.01)
(52) U.S. Cl. ................. 398/193; 398/192; 398/194; 398/162; 379/286
(58) Field of Classification Search ................. 398/158, 398/192–194
See application file for complete search history.

(56) References Cited

U.S. PATENT DOCUMENTS

| | | | | |
|---|---|---|---|---|
| 4,280,221 A * | 7/1981 | Chun et al. | ................. | 375/288 |
| 4,290,146 A * | 9/1981 | Adolfsson et al. | ............. | 398/38 |
| 4,642,804 A * | 2/1987 | Personick | ..................... | 398/91 |
| 4,662,004 A * | 4/1987 | Fredriksen et al. | .......... | 398/120 |
| 4,994,675 A * | 2/1991 | Levin et al. | ................. | 250/551 |
| 5,019,769 A * | 5/1991 | Levinson | ..................... | 372/31 |
| 5,120,985 A * | 6/1992 | Kimura | ....................... | 327/178 |
| 5,132,639 A | 7/1992 | Blauvelt | | |
| 5,210,633 A * | 5/1993 | Trisno | ........................ | 398/193 |
| 5,293,545 A * | 3/1994 | Huber | ........................ | 398/198 |
| 5,311,346 A * | 5/1994 | Haas et al. | .................. | 398/146 |
| 5,321,710 A * | 6/1994 | Cornish et al. | ................. | 372/26 |
| 5,452,254 A * | 9/1995 | Takahashi | .................... | 365/207 |
| 5,543,952 A * | 8/1996 | Yonenaga et al. | ........... | 398/185 |
| 5,862,287 A * | 1/1999 | Stock et al. | ................. | 385/123 |
| 6,188,497 B1 * | 2/2001 | Franck et al. | ................ | 398/183 |

(Continued)

FOREIGN PATENT DOCUMENTS

AU    616339 B2    11/1989

(Continued)

*Primary Examiner*—Ken N Vanderpuye
*Assistant Examiner*—Danny W Leung

(57) ABSTRACT

A multimode optical fibre communications system, and in particular to a system in which non-linearities in the propagation of the signal through a multimode optical communications channel degrade the signal presented to the receiver. The system includes an optical transmitter unit for connection to a multimode optical fibre transmission link. The transmitter unit has a data input for receiving an input data signal, a data signal processing circuit and a source of optical radiation. The data signal processing circuit is arranged to receive the input data signal from the data input and to provide a processed data signal to the source of optical radiation and the source of optical radiation is arranged to generate from this an optical signal for transmission by a multimode optical fibre. The data processing circuit is arranged to provide from the input data signal a non-inverted data signal and an inverted data signal, receive a control signal for controlling the generation of the processed data signal, apply a controllable delay in accordance with the control signal to at least one of the non-inverted and inverted data signals, and combine the non-inverted and inverted signals after the application of the controllable delay(s) and gain factor(s) to generate the processed data signal.

8 Claims, 3 Drawing Sheets

U.S. PATENT DOCUMENTS

| | | | |
|---|---|---|---|
| 6,198,559 B1* | 3/2001 | Gehlot | 398/161 |
| 6,212,311 B1* | 4/2001 | Tomita | 385/24 |
| 6,249,630 B1* | 6/2001 | Stock et al. | 385/123 |
| 6,559,996 B1* | 5/2003 | Miyamoto et al. | 398/183 |
| 6,623,188 B1 | 9/2003 | Dimmick | |
| 6,661,974 B1* | 12/2003 | Akiyama et al. | 398/95 |
| 6,678,478 B1* | 1/2004 | Ono et al. | 398/141 |
| 6,738,584 B1 | 5/2004 | Tsuda | |
| 6,763,197 B1* | 7/2004 | Hirano et al. | 398/192 |
| 6,792,020 B2* | 9/2004 | Romm | 372/38.09 |
| 6,861,904 B2* | 3/2005 | Ishigami et al. | 330/151 |
| 6,882,456 B2 | 4/2005 | Mansbridge | |
| 6,894,933 B2* | 5/2005 | Kuzmenka et al. | 365/189.05 |
| 6,942,469 B2* | 9/2005 | Seale et al. | 417/413.1 |
| 6,961,492 B2* | 11/2005 | Doerr | 385/39 |
| 7,024,056 B2* | 4/2006 | Griffin | 385/1 |
| 7,039,399 B2* | 5/2006 | Fischer | 455/422.1 |
| 7,046,621 B2* | 5/2006 | Wang et al. | 370/222 |
| 7,062,177 B1* | 6/2006 | Grivna et al. | 398/162 |
| 7,091,500 B2* | 8/2006 | Schnitzer | 250/458.1 |
| 7,099,597 B2* | 8/2006 | Saunders et al. | 398/193 |
| 7,113,700 B2* | 9/2006 | Shimizu et al. | 398/33 |
| 7,113,708 B1* | 9/2006 | Creaney et al. | 398/162 |
| 7,116,861 B2* | 10/2006 | Welch et al. | 385/24 |
| 7,123,840 B2* | 10/2006 | Hamilton | 398/137 |
| 7,158,582 B2* | 1/2007 | Gamm et al. | 375/296 |
| 7,167,490 B2* | 1/2007 | Mehuys et al. | 372/23 |
| 7,224,858 B2* | 5/2007 | Welch et al. | 385/14 |
| 7,242,868 B2* | 7/2007 | Soto et al. | 398/72 |
| 7,386,239 B2* | 6/2008 | Lee et al. | 398/183 |
| 7,460,788 B2* | 12/2008 | Schrodinger et al. | 398/135 |
| 7,466,927 B2* | 12/2008 | Chandler | 398/193 |
| 2001/0017724 A1* | 8/2001 | Miyamoto et al. | 359/158 |
| 2001/0055148 A1* | 12/2001 | Kikuchi et al. | 359/326 |
| 2002/0153950 A1* | 10/2002 | Kusunoki et al. | 330/149 |
| 2002/0165462 A1* | 11/2002 | Westbrook et al. | 600/529 |
| 2002/0191256 A1* | 12/2002 | Schemmann et al. | 359/161 |
| 2003/0011858 A1* | 1/2003 | Zucchelli et al. | 359/188 |
| 2003/0215032 A1* | 11/2003 | Langlais et al. | 375/345 |
| 2004/0022285 A1* | 2/2004 | Romm | 372/38.02 |
| 2004/0056210 A1* | 3/2004 | Scherer | 250/492.1 |
| 2004/0057734 A1* | 3/2004 | Igorevich Lakoba | 398/192 |
| 2004/0239429 A1* | 12/2004 | Kermalli | 330/280 |
| 2005/0019036 A1* | 1/2005 | Soto et al. | 398/135 |
| 2005/0069327 A1* | 3/2005 | Franck et al. | 398/141 |
| 2005/0089334 A1* | 4/2005 | Regev et al. | 398/139 |
| 2005/0093600 A1* | 5/2005 | Kwak | 327/161 |
| 2005/0175355 A1* | 8/2005 | Hauenschild et al. | 398/161 |
| 2006/0116143 A1* | 6/2006 | Kikushima | 455/501 |
| 2006/0171091 A1* | 8/2006 | Seale et al. | 361/160 |
| 2006/0274320 A1* | 12/2006 | Caplan | 356/491 |
| 2007/0009266 A1* | 1/2007 | Bothwell et al. | 398/161 |
| 2007/0064923 A1* | 3/2007 | Schmukler et al. | 379/406.1 |
| 2007/0280701 A1* | 12/2007 | Oberland | 398/192 |
| 2008/0013742 A1* | 1/2008 | Chang | 381/1 |
| 2008/0170864 A1* | 7/2008 | Nishihara et al. | 398/188 |
| 2008/0205903 A1* | 8/2008 | Yonenaga et al. | 398/186 |
| 2008/0240726 A1* | 10/2008 | Wang et al. | 398/141 |
| 2008/0309407 A1* | 12/2008 | Nakamura et al. | 330/253 |

FOREIGN PATENT DOCUMENTS

EP 0339326 A2 11/1989

* cited by examiner

MULTIMODE OPTICAL FIBRE COMMUNICATION SYSTEM

BACKGROUND a. Field of the Invention

The present invention relates to a multimode optical fibre communications system, and in particular to an optical fibre communications system in which non-linearities in the propagation of the signal through a multimode optical communications channel degrade the signal presented to the receiver.

b. Related Art

An optical signal may be subject to numerous sources of noise and distortion, both in the generation of the signal and its transmission through an optical communications channel. Sources of noise in an optical transmitter or receiver include thermal noise and shot noise. A receiver section of the receiver may also use an avalanche photodiode for high sensitivity, but this will introduce avalanche photodiode noise. The generation of an optical signal will in general be subject to other sources of noise or drift. For example, the output power of a laser diode will be subject to slow drift as it heats up in use or from changes in ambient temperature. System distortion may be due to non-linear variations owing to the use of new or existing multimode optical fibre in an optical communications link. In a multimode optical fibre, different modes have different propagation velocities, which tends to disperse a pulse into adjacent pulses, thereby causing intersymbol interference (ISI). Pulse dispersion also occurs in single mode fibre, but to a lesser extent. Such effects will therefore tend to close an eye pattern and increase the measured bit error rate (BER) at the receiver.

Although changes owing to temperature drift can be compensated for quite easily, for example by temperature stabilisation of the laser source or with automatic gain control at the receiver, it is difficult to compensate for changes owing to pulse spreading in multimode optical fibres.

As a result, high-speed communications links, for example links operating at a data rate of at least 5 Gbit/s, have tended to use single mode optical fibre together with high precision optical fibre connectors. This has been the case even when such links are operating over short distances, such as in local area networks where links are typically of the order of 10 m to 100 m in length, or over medium distances, such as in metro networks where links are typically of the order of 1 km to 10 km in length. While such high-speed communications links provide reliable performance at a very low BER, for example $10^{-12}$, there is a need for comparable performance at greatly reduced cost, and in practice this requires the use of multimode optical fibre and cheaper connectors.

Therefore in recent years, multimode optical fibres have been used in communications links operating up to 10 Gbits/s over FDDI grade multimode fibre. With an 850 nm optical source, such links have been limited to about 30 m in length. With a 1310 nm optical source, such links have been limited to 80 m in length. It is, however, necessary in up to 90% of installed multimode optical fibre communications links to be able to transmit data over at least 300 m.

It has also been proposed to use an equaliser circuit at the receiver to compensate for intersymbol interference. Such an equaliser circuit receives as an input the output from a photodetector circuit and then generates from this at least two equaliser coefficients. A signal delay line also receives the output from the photodetector circuit. Tapped outputs from the delay line are each multiplied or otherwise combined with one of the equaliser coefficients, and then summed together to generate an equalised output signal. While this method can be effective in compensating for certain types of signal distortion, this adds additional cost to the receiver circuit and does not address the root cause of the problem of distortion due to pulse spreading in multimode optical fibre.

It is an object of the present invention to provide an optical communications system and a method of communicating an optical signal in such a system that addresses this problem.

SUMMARY OF THE INVENTION

According to the invention, there is provided an optical transmitter unit for connection to a multimode optical fibre transmission link, comprising a data input for receiving an input data signal, a data signal processing circuit and a source of optical radiation, the data signal processing circuit being arranged to receive the input data signal from the data input and to provide a processed data signal to the source of optical radiation and the source of optical radiation being arranged to generate therefrom an optical signal for transmission by a multimode optical fibre, wherein the data processing circuit is arranged to:

provide from the input data signal a non-inverted data signal and an inverted data signal;

receive a control signal for controlling the generation of the processed data signal;

apply a controllable delay in accordance with the control signal to at least one of said non-inverted and inverted data signals;

apply a controllable gain factor in accordance with the control signal to at least one of said non-inverted and inverted data signals; and combine the non-inverted and inverted signals after the application of the controllable delay(s) and gain factor (s) to generate the processed data signal.

Also according to the invention, there is provided a multimode optical fibre transmission system, comprising a first and a second optical transceiver, the first transceiver having a first transmitter unit and a first receiver unit and the second transceiver having a second transmitter unit and a second receiver unit, and at least one multimode optical fibre transmission link extending between paired transmitter and receiver units for duplex optical communication between said transceivers, wherein the first transmitter unit is according to the invention, the second transceiver being adapted to detect the quality of a received optical signal at the second receiver unit and to communicate from the second transmitter unit to the first receiver unit information indicative of said received signal quality, said first transceiver being adapted to generate the control signal in response to said information to optimise the quality of the received signal at the second receiver unit.

The invention further provides a method of transmitting data in an optical communication system over a multimode optical fibre, comprising:

receiving an input data signal;

providing from the input data signal a non-inverted data signal and an inverted data signal;

applying a controllable delay to at least one of said non-inverted and inverted data signals;

applying a controllable gain factor to at least one of said non-inverted and inverted data signals;

receiving a control signal to permit control of the delay(s) and gain factor(s);

combining the non-inverted and inverted signals after the application of the controllable delay(s) and gain factor (s) signals to generate a processed data signal;

using the processed data signal to generate an optical signal;

transmitting the optical signal over a multimode optical fibre.

The term "gain" includes both positive gains and negative gains (i.e. attenuations)

In an embodiment of the invention, the data processing circuit includes:

a first variable delay line and an associated control input for applying a first controllable delay in accordance with the control signal;

a second variable delay line and an associated control input for applying a second controllable delay in accordance with the control signal;

a first variable gain stage and an associated control input for applying a first controllable gain in accordance with the control signal;

a second variable gain stage and an associated control input for applying a second variable gain in accordance with the control signal.

It should be noted that either digital or analogue electronics, or a mixture of these, may be used to implement aspects of the invention. For example, the delay lines may be analogue or digital delay lines, and in the latter case may be implemented in software or firmware, for example within a digital signal processor (DSP) chip. Similarly, the variable gains may be implemented using analogue amplifiers or digitally, for example or in software or firmware as in a DSP chip.

Preferably, there is a user adjustable setting for varying the controllable delay and/or varying the controllable gain factor. This setting may conveniently be calibrated in terms of the length of multimode optical fibre to be connected to the transmitter.

BRIEF DESCRIPTION OF THE DRAWINGS

The invention will now be further described, by way of example only and with reference to the accompanying drawings, in which.

DETAILED DESCRIPTION

Figure 1:
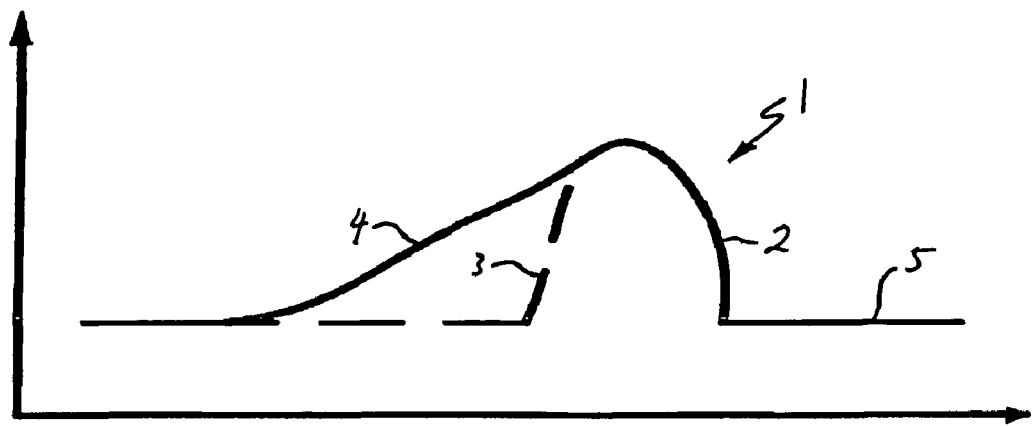
FIG. 1 is a schematic drawing showing how pulse spreading in a multimode optical fibre degrades a received pulse.

FIG. 1 illustrates one example of how an optical pulse 1 can become degraded during a transmission through a multimode optical fibre. The horizontal axis represents either time or distance along the length of the fibre and the vertical axis is the intensity of the transmitted optical radiation. There will, however, be considerable variability in the particular form of pulse distortion in a multimode optical fibre link, depending on a number of factors such as the type and length of the optical fibre.

Initially, the pulse 1 is narrow having a sharp rising edge 2 and a similarly sharp falling edge 3. As the pulse is transmitted along the length of the fibre, different modes travel at different speeds. The result is that the received pulse will be spread out, mainly along a trailing edge 4. The intensity of the received pulse will also drop somewhat, although in FIG. 1 the peak transmitted and received intensities are shown as being the same so that the change in shape of the pulse can be better visualised.

Figure 2:
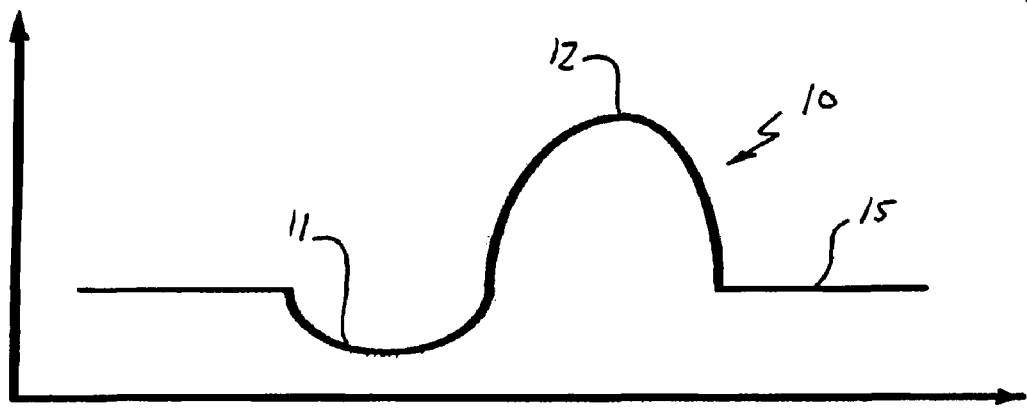
FIGS. 2 and 3 are a schematic drawings showing respectively how pre-compensation can be used to alter the shape of the transmitted pulse so that degradation of the received pulse is reduced.
Figure 3:
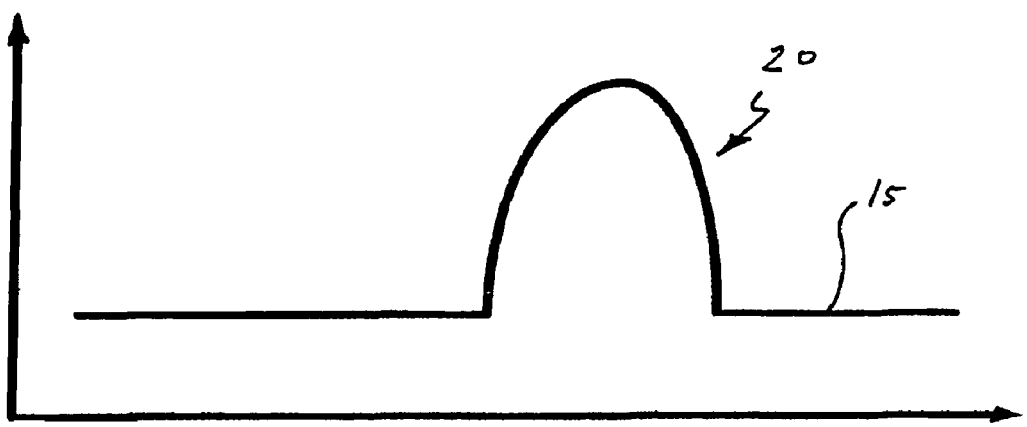

FIG. 2 shows how a pulse 10 can be initially pre-compensated by inclusion of a dip in intensity 11 following an initial peak 12 so that pulse spreading during transmission will tend to fill in the dip 11 resulting in a more nearly optimal received pulse 20 as shown in FIG. 3. For this form of pre-compensation to work in an optical transmission system, it is necessary for there to be a non-zero baseline 15 in which the dip 11 in intensity is formed. This form of pre-compensation may therefore require a baseline 15 that is higher than a typical baseline 5 which would be present in a multimode optical fibre as shown in FIG. 1 not having pre-compensation. Normally, in an optical communication system, a laser diode is biased so that the optical output is at the base of a linear intensity vs. current characteristic curve. Depending of the form of pre-compensation, the invention may require that the laser diode is based somewhat higher than the base of this liner slope so that the dip 11 is sufficiently deep to compensate for pulse spreading of the trailing edge.

Figure 4:
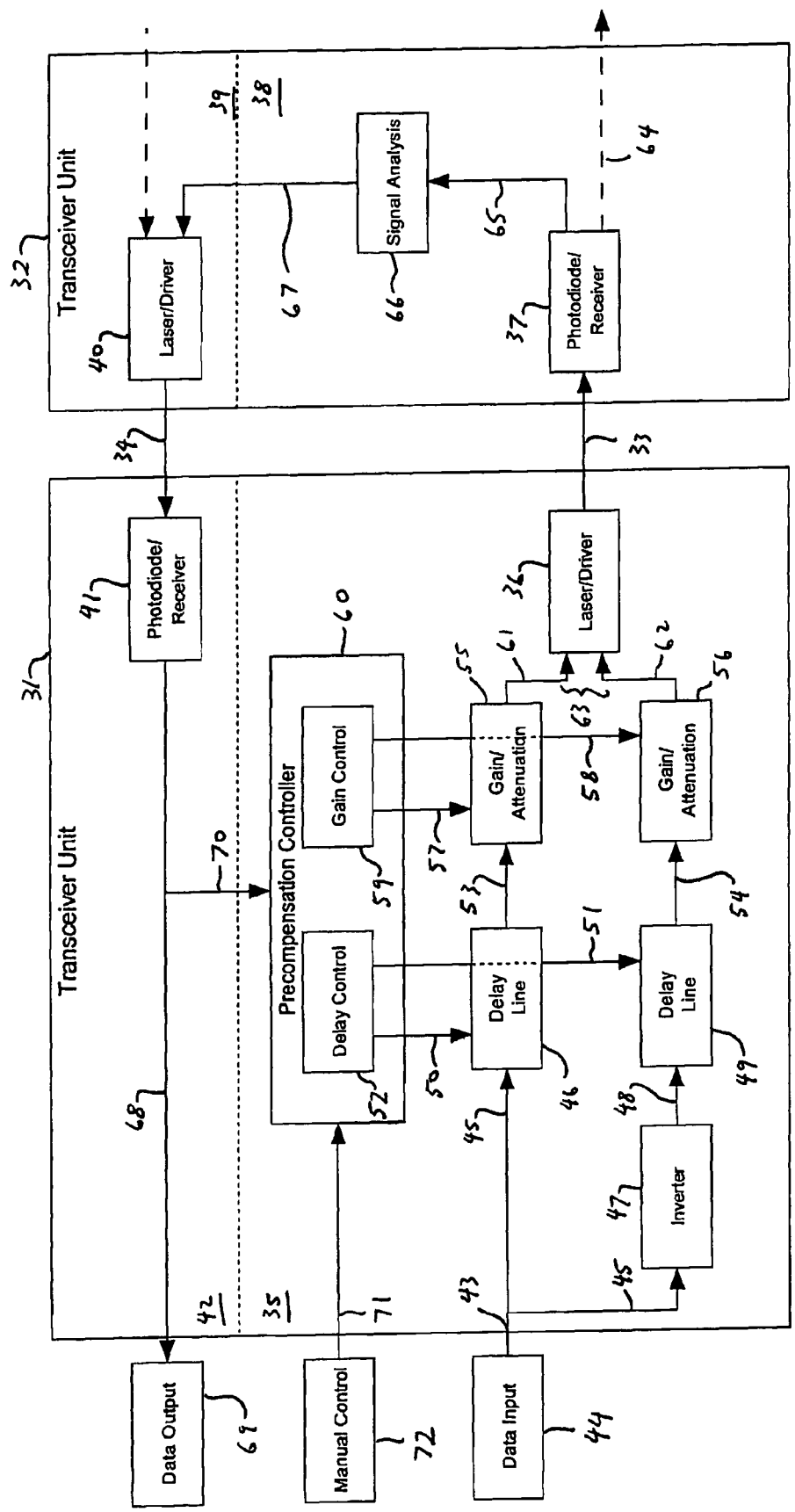
FIG. 4 is a schematic diagram of a multimode optical fibre transmission system according to a preferred embodiment of the invention, having a pair of optical transceiver units connected over a pair of multimode optical fibres, with a first transceiver being arranged to provide the pre-compensation of FIG. 2 and the other being arranged to analyse the received signal and to communicate with the first optical transceiver to adjust and optimise the pre-compensation.

FIG. 4 shows a schematic diagram of a multimode optical fibre transmission system 30 according to a preferred embodiment of the invention. The system 30 has a pair of optical transceiver units 31, 32 connected by a pair of multimode optical fibre transmission links 33, 34. A first transceiver unit 31 has an optical transmitter 35 with a source of optical radiation 36 that transmits optical signals along a first multimode optical fibre link 33 to a photodetector 37, which is part of an optical receiver 38 in a second transceiver unit 32.

The second transceiver unit 32 has an optical transmitter 39 with a source of optical radiation 40 that transmits an optical signal over a second multimode optical fibre link 34 to a photodetector 41 in an optical receiver 42 of the first transceiver unit 31.

The sources of optical radiation 36, 40 will each normally comprise a laser diode and associated electronic driver circuitry. The photodetectors 37, 41 will normally comprise a photodiode with associated receiver circuitry. Not shown are the optical plugs and receptacles or the structure of the optical fibre 33, 34 itself as these can be provided from conventional optical connectors and multimode optical fibre cable.

The first optical transceiver unit 31 has a signal input 43 that is connected to an external source of data 44. The input data 43 may be processed or conditioned by conventional input circuitry (not shown). A non-inverted data signal 45 is provided to a first delay line 46. A data inverter 47 receives the same non-inverted signal 45 and provides an inverted data signal 48 to a second delay line 49. The relative delay between the two delay lines 46, 49 can be adjusted by respective delay control signals 50, 51 provided by a delay control circuit 52. This arrangement allows a relative delay between the non-inverted and inverted signals 45, 48 to be set by the delay control 52. Because it is the relative delay that needs to be adjustable, it is only necessary for there to be one delay line 46, 49 and so FIG. 4 shows a more general circuit arrangement.

The delay lines 46, 49 provide respective delayed non-inverted and inverted signals 53, 54 which are passed to associated amplitude control stages 55, 56 so that the relative amplitudes of the non-inverted and inverted delayed signals 53, 54 can be set be means of control signals 57, 58 provided by a gain control circuit 59.

The delay control circuit 52 and the gain control circuit 59 together comprise a pre-compensation controller 60. As explained in more detail below, the pre-compensation controller 60 can be controlled either automatically or manually in order to optimise the form of the pre-compensation.

The outputs 61, 62 from the amplitude control stages 55, 56 are then combined to generate a processed data signal 63, for example either by adding the signals together or by providing these as inputs to separate amplifiers which are then combined. It should be noted that in this arrangement, the position of the inverter 47, and indeed the order of the provision of the delay and amplitude control, may be different from that shown. For example, the inverter 47 may be provided after the final delay or amplitude control stage 49, 56. Alternatively, the inversion may be provided by a negative input to an amplifier.

As can be appreciated from FIG. 4, this form of pre-compensation is simple to provide and can be readily implemented in either analogue or digital electronics. This is also an effective form of pre-compensation, as the relative delays and amplitudes of the inverted and non-inverted signal can be adjusted in order to compensate for the trailing edge of a degraded optical signal after transmission through multimode optical fibre.

The transmitted signal 33 is received by the optical receiver 38 of the second transceiver unit 32. A signal output 64 may be provided from receiver circuitry within the photoreceiver 37. In one aspect of the invention, the receiver circuitry also provides the received signal 65 to signal analysis circuitry 66 arranged to analyse the quality of the received signal, for example in terms of bit error rate, or time intervals between logical signal transmissions. The signal analysis circuitry 66 provides an input 67 to the optical transmitter 40 in order to send a control signal across the second multimode optical fibre 34 to the photoreceiver 41 in the first transceiver unit 31. The photoreceiver 41 provides a signal output 68 both as a data output 69 and as a control input 70 to the pre-compensation controller 60. In this way, the signal analysis circuitry 66 can communicate with the pre-compensation controller 60 in order to provide closed loop control of the processed data signal 63. In order to avoid problems due to no or inadequate pre-compensation in the second multimode link 34, the controller signal 67 from the signal analysis circuitry 66 may be provided in the form of a relatively low frequency signal not affected by pulse spreading that can be decoded by the pre-compensation controller 60.

Additionally, or alternatively, the transceiver unit 3 may have a manual control input 71 connected to a manual control such as switches or a dial 72 by which a user can manually set a desired level of pre-compensation. For example, a manual pre-compensation control 72 could be calibrated in terms of the length of optical fibre 33 between the two transceiver units 31, 32.

Figure 5:
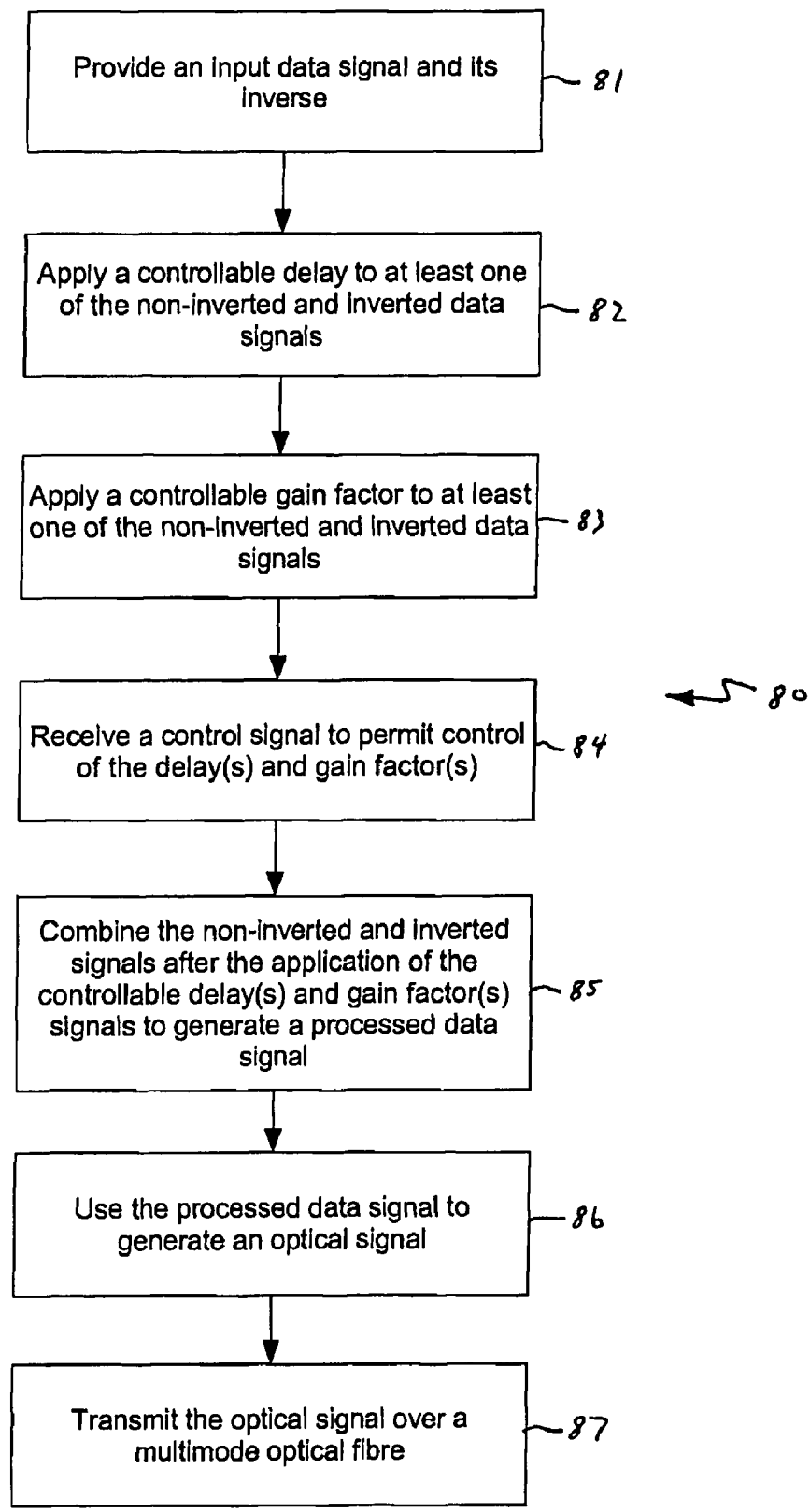
FIG. 5 is a flowchart of transmitting data in an optical communication system over a multimode optical fibre according using an optical transmitter unit according to a preferred embodiment of the invention.

FIG. 5 shows a flowchart 80 that illustrates the main steps in a method of transmitting data in the optical communication system 30. An input data signal is provided 81 together with its inverse. A controllable delay can then be applied 82 to at least one of the non-inverted and inverted data signals. One way of doing this is to use a first variable delay line to delay the non-inverted data signal and a second variable line to delay the inverted data signal while using a control signal to control the relative delay between the first and second delay lines.

A controllable gain factor is then applied 83 to at least one of the non-inverted and inverted data signals. One way of doing this is to use a first gain stage to attenuate or amplify the non-inverted data signal and using a second gain stage to attenuate or amplify the inverted data signal, while using a control signal to control the relative gain of the first and second gain stages.

A control signal is then received 84 to permit control of the relative delays and gain factors. One way in which this may be done is to adjust manually a setting that is calibrated in terms of the length of multimode optical fibre to be connected to the transmitter in order to adjust the controllable delay and/or the controllable gain factor. Another way in which this may be done is to receive at a second optical transceiver unit the optical signal transmitted over the multimode optical fibre, and then detect the quality of the received optical signal. Following this the control signal may be automatically generated in response to the detected quality of the received optical signal to optimise the quality of the received signal at the second optical transceiver unit.

The non-inverted and inverted signals are then combined 85 after the application of the controllable relative delays and gain factors to generate a processed data signal, which is then used 86 to generate an optical signal for transmission 87 over a multimode optical fibre link.

The invention therefore provides a convenient system and method of communicating an optical signal in a multimode optical fibre communication system, which may suffer from transmitted signal generation due to the different signal transmission properties of various optical modes in the optical fibre.

It is to be recognised that various alterations, modifications, and/or additions may be introduced into the constructions and arrangements of components described above without departing from the scope of the present invention, as defined by the appended claims.

The invention claimed is:

1. An optical transmitter unit for connection to a multimode optical fibre transmission link, comprising:
   a data input for receiving an input data signal;
   a data signal processing circuit and a source of optical radiation, the data signal processing circuit being arranged to receive the input data signal from the data input and to provide a processed data signal to the source of optical radiation and the source of optical radiation being arranged to generate therefrom an optical signal for transmission by a multimode optical fibre, the data signal processing circuit comprising:
   a first variable delay line and an associated control input for applying a first controllable delay in accordance with the control signal;
   a second variable delay line and an associated control input for applying a second controllable delay in accordance with the control signal;
   a first variable gain stage and an associated control input for applying a first controllable gain in accordance with the control signal;
   a second variable gain stage and an associated control input for applying a second variable gain in accordance with the control signal;
   wherein the data signal processing circuit is arranged to:
   provide from the input data signal a non-inverted data signal and an inverted data signal;

receive a control signal for controlling the generation of the processed data signal; apply a controllable delay in accordance with the control signal to at least one of said non-inverted and inverted data signals;

apply a controllable gain factor in accordance with the control signal to at least one of said non-inverted and inverted data signals; and combine the non-inverted and inverted signals after the application of the controllable delay(s) and gain factor(s) to generate the processed data signal.

2. An optical transmitter unit as claimed in claim 1, comprising a driver circuit for driving the source of optical radiation using the processed data signal.

3. An optical transmitter unit as claimed in claim 1, comprising a user adjustable setting for varying the controllable delay and/or varying the controllable gain factor, said setting being calibrated in terms of the length of multimode optical fibre to be connected to the transmitter.

4. A multimode optical fibre transmission system, comprising:
a first and a second optical transceiver, the first optical transceiver having a first transmitter unit and a first receiver unit and the second optical transceiver having a second transmitter unit and a second receiver unit;
at least one multimode optical fibre transmission link extending between paired transmitter and receiver units for duplex optical communication between said transceivers; and
signal analysis circuitry in the second optical transceiver for analyzing a processed data signal produced by the first optical transceiver and generating a feedback signal comprising information indicative of received signal quality for an optical signal, the feedback signal from the signal analysis circuitry being modulated on an optical carrier,
wherein the first transmitter unit comprises a data input for receiving an input data signal, a data signal processing circuit and a source of optical radiation, the data signal processing circuit being arranged to receive the input data signal from the data input and to provide the processed data signal to the source of optical radiation and the source of optical radiation being arranged to generate therefrom an optical signal for transmission by a multimode optical fibre, wherein the data signal processing circuit is arranged to:
provide from the input data signal a non-inverted data signal and an inverted data signal;
receive the control signal for controlling the generation of the processed data signal;
apply a controllable delay in accordance with the control signal to at least one of said non inverted and inverted data signals;
apply a controllable gain factor in accordance with the control signal to at least one of said non-inverted and inverted data signals; and
combine the non-inverted and inverted signals after the application of the controllable delay(s) and gain factor(s) to generate the processed data signal, the second optical transceiver being adapted to detect the quality of a received optical signal at the second receiver unit with the signal analysis circuitry and to communicate from the second transmitter unit to the first receiver unit the feedback signal comprising information indicative of said received signal quality, said first optical transceiver being adapted to generate the control signal in response to said information to optimise the quality of the received signal at the second receiver unit and the control signal causing the first optical transceiver to compensate for optical propagation non-linearities occurring in the multimode optical fibre transmission link.

5. A method of transmitting data in an optical communication system over a multimode optical fibre, comprising:
receiving an input data signal;
providing from the input data signal a non-inverted data signal and an inverted data signal;
using a first variable delay line to delay the non-inverted data signal;
using a second variable delay line to delay the inverted data signal;
applying a controllable gain factor to at least one of said non-inverted and inverted data signals;
receiving a control signal to permit control of the delay(s) and gain factor(s);
using the control signal to control a relative delay between the first and second delay lines;
combining the non-inverted and inverted signals after the application of the variable delay(s) and gain factor(s) signals to generate a processed data signal;
using the processed data signal to generate an optical signal; and
transmitting the optical signal over a multimode optical fibre.

6. A method as claimed in claim 5, comprising: using a first gain stage to attenuate or amplify the non-inverted data signal; using a second gain stage to attenuate or amplify the inverted data signal; and using the control a relative gain of the first and second gain stages.

7. A method as claimed in claim 5, comprising: adjusting a setting that is calibrated in terms of the length of multimode optical fibre to be connected to the transmitter unit in order to adjust the variable delay and/or a controllable gain factor.

8. A method as claimed in claim 5, comprising:
receiving at an optical transceiver unit the optical signal transmitted over the multimode optical fibre;
detecting the quality of said received optical signal; and
automatically generating the control signal in response to the detected quality of said received optical signal to optimise the quality of the received signal at the optical transceiver unit.

* * * * *